United States Patent [19]

Kaizuma et al.

[11] Patent Number: 4,530,599
[45] Date of Patent: Jul. 23, 1985

[54] PHOTOGRAPHIC PRINTER

[75] Inventors: Hisayuki Kaizuma; Haruo Hakamada, both of Hino, Japan

[73] Assignee: Konishiroku Photo Industry Co., Ltd., Tokyo, Japan

[21] Appl. No.: 527,342

[22] Filed: Aug. 29, 1983

[30] Foreign Application Priority Data

Aug. 30, 1982 [JP] Japan ............................... 57-149207
Aug. 30, 1982 [JP] Japan ............................... 57-149208
Sep. 21, 1982 [JP] Japan ............................... 57-163232
Sep. 21, 1982 [JP] Japan ............................... 57-163233

[51] Int. Cl.³ ..................... G03B 27/62; G03B 27/52
[52] U.S. Cl. ......................................... 355/75; 355/41
[58] Field of Search ..................... 355/18, 41, 67, 72, 355/77, 75

[56] References Cited

U.S. PATENT DOCUMENTS

| 2,995,979 | 8/1961 | Gordon et al. | 355/75 |
| 3,288,025 | 11/1966 | Litz et al. | 355/41 |
| 3,511,565 | 5/1970 | Harman et al. | 355/72 X |
| 3,635,555 | 1/1972 | Kurahashi et al. | 355/75 X |
| 4,435,076 | 3/1984 | Tatsunosuke | 355/77 X |

FOREIGN PATENT DOCUMENTS 1181043 11/1964 Fed. Rep. of Germany ........ 355/75
1194243 6/1965 Fed. Rep. of Germany ........ 355/75

Primary Examiner—Donald A. Griffin
Attorney, Agent, or Firm—Jordan B. Bierman

[57] ABSTRACT

A photographic printer comprises negative film supply, transport, and printing exposure sections which have mutually interchangeable supply and transport mechanisms for supplying and transporting 135-size films and disc films to the printing exposure section. The supply and transport mechanism for disc films has a section containing a plurality of disc films which are transported automatically to the printing section through a transporting section of the disc film supply and transport mechanism. The negative film supply section also has a delivery section for 135-size cut films and the delivery section for disc films, which are mutually interchangeable to supply either 135-size cut films or disc films.

6 Claims, 14 Drawing Figures

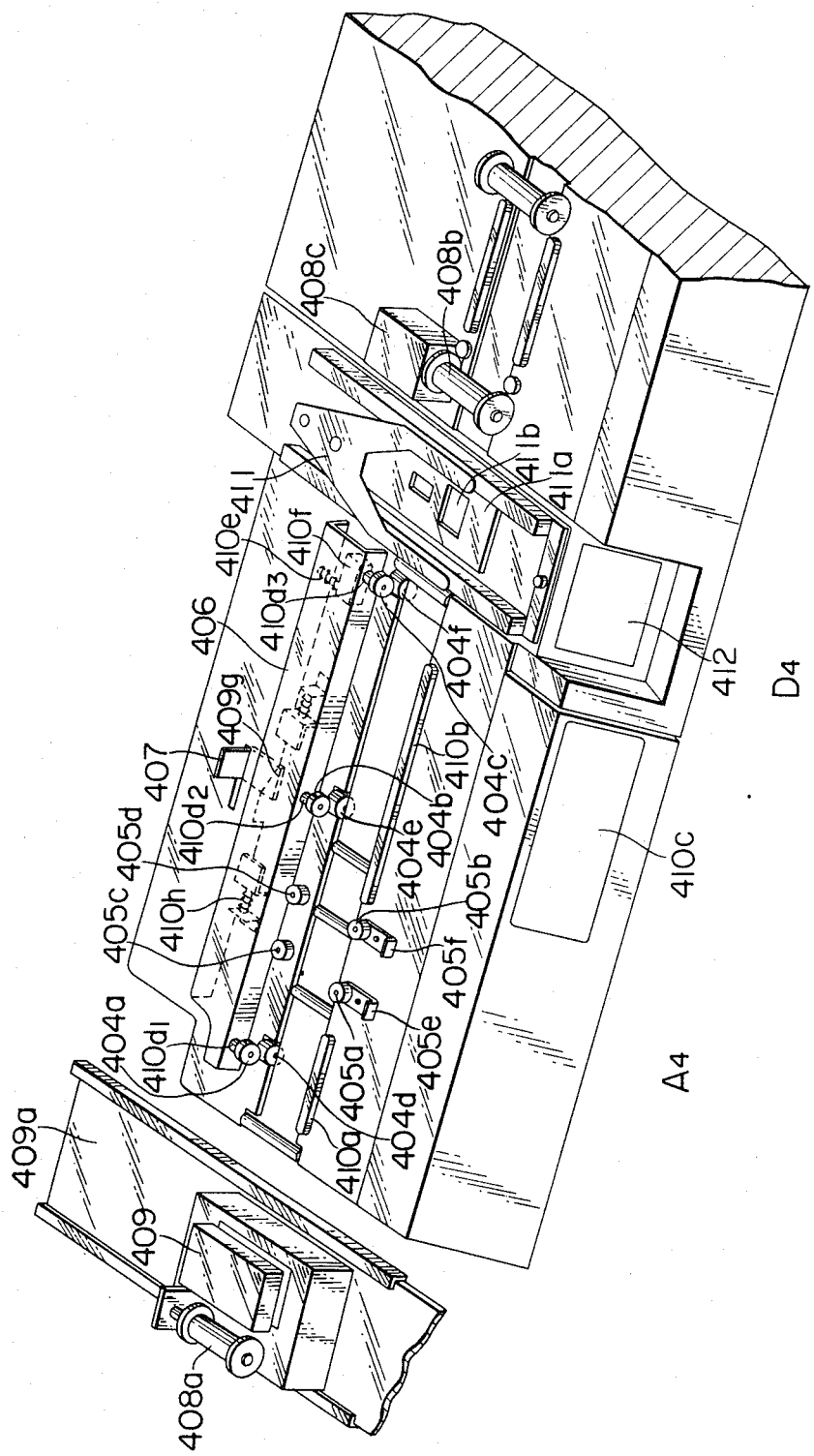

PHOTOGRAPHIC PRINTER

BACKGROUND OF THE INVENTION

1. Field of the Invention

The present invention relates to a photographic printer, particularly to a photographic printer which enables the changeover from the disc film printing operation to the cut film printing operation, and vice versa, and more particularly to a photographic printer having a supply section, a transport section and a printing section, which, in the printing operations of 135-size roll films, cut films and photographic disc films, are interchangeably used.

Inter alia, with the photographic disc films, the present invention relates to a photographic printer which allows sequentially taking photographic disc films out of the holder section thereof for the photographic printing operation.

Inter alia, with the 135-size roll films, the present invention relates to a photographic printer having a transport section for common use in the transport of roll films and of cut films.

2. Description of the Prior Art

Generally speaking, to photo service bureaus or photofinishers there are usually brought in mixedly concurrent printmaking with film development-mostly required roll films, additional prints-mostly desired cut films, and disc films for disc camera use.

Conventional photographic printers include those exclusive roll film printers having roll film supply and take-up sections and an automatic transport unit, those exclusive cut film printers having an automatic cut film transport unit, and those exclusive disc film printers having an automatic transport unit to transport disc films for disc camera use, which were separately prepared for the printing of photographic printing papers from the developed roll films, cut films, and disc films, respectively. For this reason, any photofinishing service bureau needed a large area for the installation of exclusive photographic printers, which, in some cases, made it difficult to carry highly productive photofinishing services due to many inconveniences, and therefore there has been desired some improvement on this problem.

The negative roll film printing, because of the designation of either concurrent printing with film development or same size printing performed by an automatic negative film judgement process provided prior to the photographic paper printing process, can be rapidly and efficiently carried out, but the printing of cut film negative requires the input of necessary information for the designation of individual frames to be printed, of the quantity of prints to be made, and of others necessary for the printing operation process, which causes the operation time to become elongated, and therefore the effective use of high-performance photographic printers has been desired. Further, for disc film for disc camera use, because disc film for disc camera use is different from long 135-size film, the transport mechanism for disc film is also different, so that in the case where the printing of films of both types mixedly present should be performed, the handling of those printer's components exclusively prepared for the 135-size film printing process and the handling of those exclusively prepared for the disc film printing process become complicated, so that there have so far often appeared such a trouble that the efficiency of the 135-size film printing operation is lowered, thus leading to the deterioration of the photofinishing service quality.

Generally speaking, in the printing process performed by photofinishers, disc negative films and 135-size negative films are mixedly handled. In the case of making prints from negative films by a printer, in the printing exposure process, an exclusive printer must be used for the negative film to be printed. Where disc negative films and 135-size negative films are to be printed by one printer, as in the case of projection lenses, the negative film masks also must be used changing from the disc negative film mask to the 135-size negative film mask, and vice versa. Also in the 135-size negative film, there must be made the interchange of the negative masks as well as of the projection lenses according to the full size or half size of 135-size images. Although the negative film mask for the full size is allowed to be applied to the printing of half-size images, the use of it deteriorates the printed image quality because the flatness of the negative film is not secured. For disc negative films it is particularly essential to secure the flatness of the negative film because of the larger magnification in enlarging the film image. For this reason, there have been the disadvantage that every time when one film size is changed to another, the readjustment of lens focussing, and the like must be made, thus complicating the operation in the printing exposure process, leading to the lowering of the operation efficiency.

There has been another disadvantage that the mixedly handling of disc negative films with different other films tends to cause the delay of the 135-size film service operation, making it difficult to improve the photographic print-finish service.

A further disadvantage also exists which is such that every time when the lens change and negative film change are made with a photographic printing paper staying in a given position, correct adjustment of the lens focussing as well as of the exposure must be made, and also there are required a semiautomatic operation process for the measurement of the transmission light from different-size negative films, and the readjustments of the chromatic quality of the light from the exposure light source and of the exposure time into appropriate ranges, and for this reason a LATD measurement unit is arranged in the negative film printing position, but this arrangement produces such an unfavorable condition that because in the case of such a short-focus lens as the disc film lens, the distance between the negative film and the lens is extremely small, for example, in the case of the automatic disc film lens-to-other lens interchangeable mechanism, there occurs an interference between the photometer unit and the lens unit.

Also taking the case of photographic disc films, conventional photographic printers for photographic disc films have not less than two spindles for photographic disc film use in the film supply section thereof, the spindles being provided thereon with a plurality of photographic disc films stacked up during the printing operation.

Therefore, the supply of photographic disc films is made by taking one by one off the spindle from the bottom of the stack. The photographic disc films that have been subjected to printing exposures are stacked by putting them one by one on another spindle arranged in a different position than the original supply position from the upside thereof thus to be held in the take-up section.

For this reason, conventional photographic printers require two same-type spindles, one in the supply section and the other in the take-up section, and also require the holding sections therefor, thus leading to the increase in the area for the installation of the photographic printer.

Further, in such spindles there is the disadvantage that there is a case where the stacking order of photographic disc films in supplying becomes reverse to that in receiving depending on whether disc films are stacked in order from the upside or from the downside, which may, in order to reverse the order, require again an operation of transferring the printing exposure-completed photographic disc films from the spindle provided therefor to another arranged for the purpose of reversing the order, thus leading to the repetition over several times of transferring of photographic disc films from spindle to spindle during the process of from film development to the time of shipment, and tending to produce some errors in the operation of, e.g., printing a large number of photographic disc films, thereby complicating the arrangement of photographic disc films by lot.

There is also another disadvantage that if a trouble occurred in the printing exposure process under the condition of the two spindles each having a disc film stack, the accomplishment of the orderly arrangement of disc films without fail takes a lot of time because of the need for coping with the trouble.

Taking the case of 135-size films, conventional photographic printers include those roll film printers having both roll film supply section and an automatic transport unit and those cut film printers having a cut film transport unit. These roll film printers and cut film printers were separately arranged for making prints from developed roll film negatives and from cut film negatives, respectively. For this reason, any photofinishing bureau needed a large area for the installation of photographic printers, which, in some cases, made it difficult to carry out highly productive photofinishing services due to many inconveniences, and therefore there has been desired some improvement on this problem.

In the case of the printing of roll film negatives, by providing an automatic negative's judgement process prior to the photographic printing paper printing process, the designation of concurrent printing or same size printing is made, whereby a rapid and efficient printing operation is carried out, but in the printing of cut film negatives, even if a negative's automatic judgement process were provided, there would be required a long preparation time prior to the printing process due to the input of necessary information for the designation of frames to be printed, of the quantity of prints to be made, and of others required in the printing operation line, thus causing the operation time to become elongated, resulting in the imbalance with the operation time of the roll film printer. For this reason, there has been desired the development of a photographic printer capable of solving these problems and having a high performance.

OBJECTS AND SUMMARY OF THE INVENTION

It is an object of the present invention to provide a photographic printer having a supply section, a transport section, and a printing section, which sections are mutually interchangeable for the printings of roll films, cut films and disc films.

It is another object of the present invention to provide a photographic printer capable of contributing to a high printing operation efficiency, thereby increasing the productivity and reducing the operation cost in photofinishers.

The invention provides a photographic printer comprising negative film supply, transport, and printing exposure sections, said sections having mutually interchangeable negative film supply and transport mechanisms composed of means to supply and transport 135-size films to said printing exposure section and means to supply and transport disc films to said printing exposure section, said negative film supply section having a plurality of disc films holding section from.which said disc films are supplied and transported automatically by and through said transport section to said printing exposure section.

BRIEF DESCRIPTION OF THE DRAWINGS

FIG. 13 is a perspective view of the transport section and negative film mask section of the photographic printer for 135-size film use of the present invention.

DESCRIPTION OF THE PREFERRED EMBODIMENTS

The photographic printer of the present invention is illustrated in detail in reference to the drawings.

Figure 1:
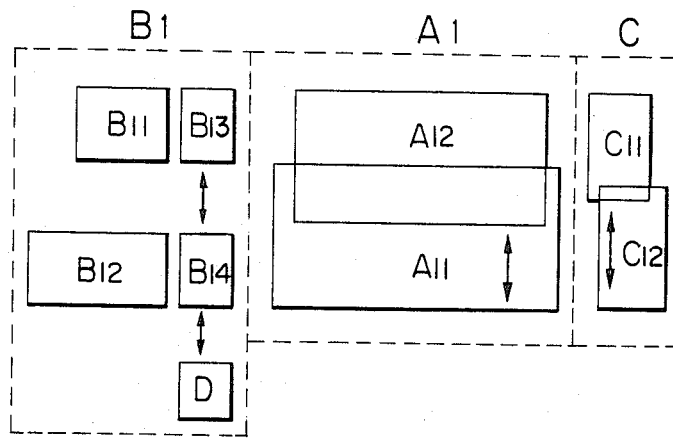
FIG. 1 is a schematic diagram showing the construction of the photographic printer of the invention.

FIG. 1 is a schematic diagram of the construction of the photographic printer of the present invention, wherein $A_1$ is a transport section, $A_{11}$ is a disc film transport section, $A_{12}$ is a 135-size film transport section, the 135-size film transport section $A_2$ being connectable to and integrated with the disc film transport section $A_{11}$, $B_1$ is a film supply section, $B_{11}$ is a disc film holder case, $B_{12}$ is a 135-size cut film holder case, $B_{13}$ is a disc film delivery section, $B_{14}$ is a 135-size cut film delivery section, and $D_1$ is a 135-size roll film cleaner section.

Disc film holder case $B_{11}$ is mountable to disc film delivery section $B_{13}$, 135-size cut film holder case $B_{12}$ is mountable to 135-size cut film delivery section $B_{14}$, and 135-size roll film cleaner section $D_1$ is mutually interchangeable with the disc film delivery section $B_{13}$ and with the 135-size cut film delivery section $B_{14}$, the disc film delivery section $B_{13}$, the 135-size cut film delivery section $B_{14}$, and the 135-size roll film cleaner section $D_1$ being connectable to the transport section $A_1$, respectively.

$C_1$ is a printing exposure section, $C_{11}$ is a disc negative film mask section, $C_{12}$ is a 135-size negative film mask section, the disc negative film mask section $C_{11}$ and the 135-size negative film mask section $C_{12}$ being mutually interchangeable.

In the photographic printer of the present invention, in printing disc films, disc film holder case $B_{11}$, disc film delivery section $B_{13}$, disc film transport section $A_{11}$ and disc negative film mask section $C_{11}$ are connected to one another to be integrated to thereby become a photographic printer having a train of disc film treating mechanisms. In the case of printing 135-size cut films, 135-size cut film holder case $B_{12}$, 135-size cut film delivery section $B_{14}$, 135-size cut film transport section $A_{12}$ integrated with disc film transport section $A_{11}$, and 135-size negative film mask section $C_{12}$ are connected to one another to be integrated to thereby become a photographic printer having a train of 135-size film-treating mechanisms. And in the case of printing 135-size roll films, film cleaner section $D_1$, 135-size film transport section $A_{12}$, integrated with disc film transport section $A_{11}$, and 135-size negative film mask section $C_{12}$ are connected to one another to be integrated to thereby become a photographic printer having a train of 135-size roll film-treating mechanisms.

Figure 2:
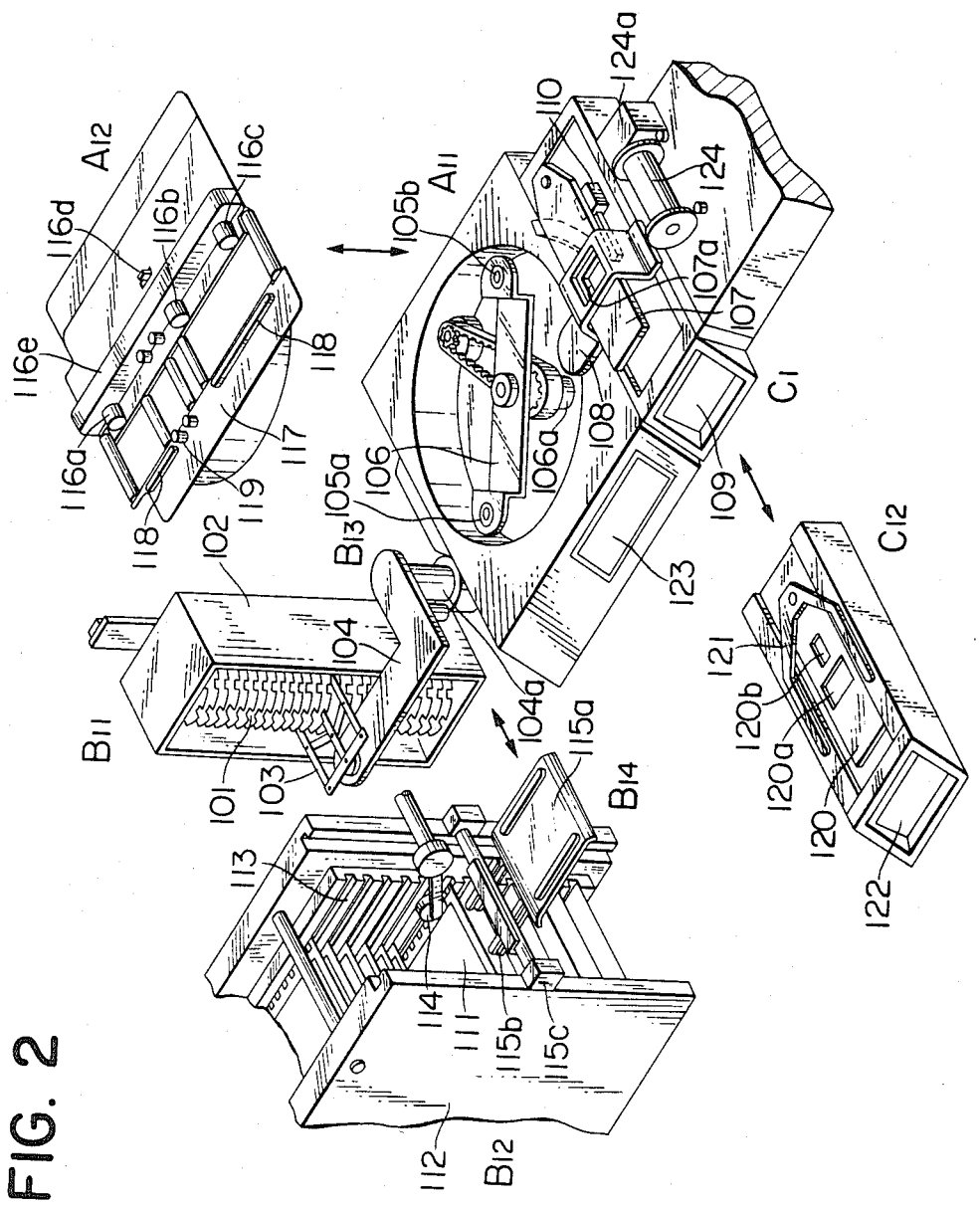
FIG. 2 is an explanatory perspective view of the respective mutually-interchangeable component units of the photographic printer of the present invention.

One of the preferred embodiments of the present invention is shown in FIG. 2, by which the structure of the photographic printer of the present invention is illustrated in detail below:

The structure of the photographic printer prepared for printing disc films is such that in disc film section $B_{11}$, 101 are disc films, 102 is a disc film holder case, in which a plurality of disc films 101 are stored in order by a holder member (not shown) of the disc film holder case 102. In disc film delivery section $B_{13}$, 103 is a magic hand, 104 is a rotative arm, onto which is rotatably mounted a magic hand 103. Rotative arm 104 is rotatable alternately counterclockwise and clockwise 180 degrees by a rotating shaft 104a. In disc film transport section $A_{11}$, 105a and 105b are disc film rotating axis casings, and 106 is an arm, onto both ends of which are rotatably mounted disc film rotating axis casings 105a and 105b. Arm 106 is continuously rotated counterclockwise 180 degrees by rotating shaft 106a.

In disc negative film mask section $C_{11}$, 107 is a negative film pressure plate, 107a is an exposure window, which is provided on the negative film pressure plate 107, 108 is a disc film leap prevention plate, 109 is a viewer, and 110 is a frame feed ratchet.

The structure of the photographic printer prepared for the 135-size cut film printing is such that in 135-size cut film holder case $B_{12}$ as the 135-size cut film supply section, 111 is a 135-size cut film, 112 is a cut film holder case, 113 are holder grooves, which are provided inside the cut film holder case 112, and the plurality of cut films 111 one each of which is inserted and stored in the respective grooves 113.

In cut film delivery section $B_{14}$, 114 is a sprocket, 115a is a guide plate, 115b is a regulation guide, and 115c is a gear section, which all are fixedly provided at the entrance of the cut film holder case 112. Sprocket 114 engages with the upper surface of one of the cut films 111 inserted with their fore ends vertically aligned into holder grooves 113.

In 135-size cut film transport section $A_{12}$, 116a, 116b and 116c are cut film feed rollers, each of which is juxtaposed forming a pair with one of the lower pressure rollers (not shown), and 116d is a changeover member, the lever operation of which changeover member moves a roller support plate 116e up and down to thereby move the cut film feed rollers 116a, 116b and 116c up and down to be contacted with or released from the lower pressure rollers. The cut film feed rollers 116a, 116b and 116c rotate synchronously. 117 is a film advance plate. 118 is a film guide. 119 are side guide rollers, which rotate to guide both sides of a roll film, and, during the transport of cut films, the space formed by the side guide rollers is extended so as not to contact the rollers with cut film, so that the advance of the cut film is not obstructed.

In 135-size negative film mask section $C_{12}$, 120 is a negative film mask plate, 120a is a full-size exposure window, and 120b is a half-size exposure window, which both windows are provided in the negative film mask plate 120. 121 is a negative film pressure plate, which follows the negative film mask plate 120. 122 is a viewer. 123 is a negative film examination window, through which negative films can be examined by the eye. 124 is a main feed roller, which is directly connected to a DC motor 124a, which drives roll films or cut films to advance.

Figure 3:
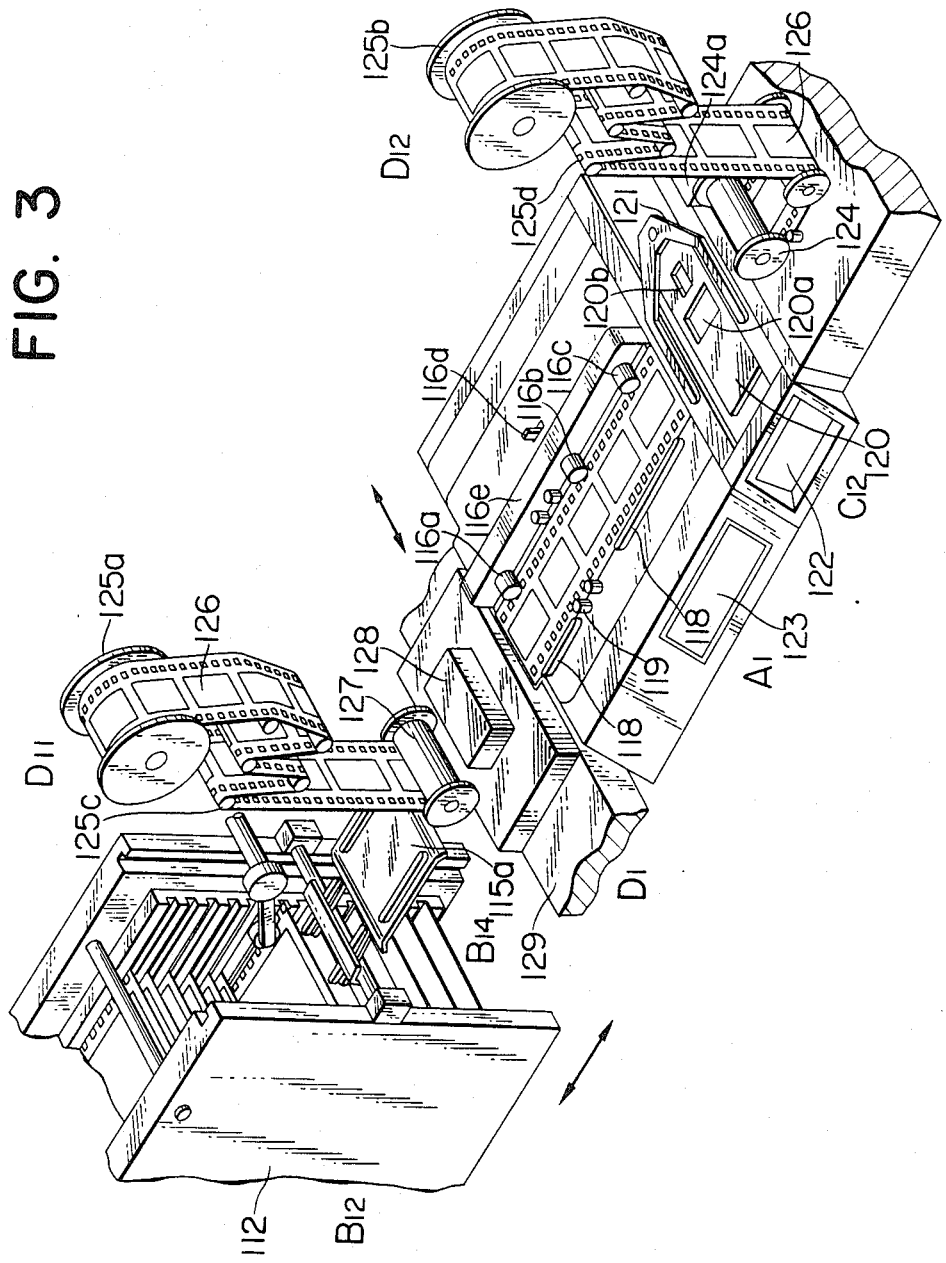
FIG. 3 is a partially cut-off perspective view showing the condition in operation of the photographic printer prepared for the 135-size roll film printing, which has been interchanged from the condition prepared for the 135-size cut film printing operation.

In FIG. 3, the structure of the photographic printer prepared for printing 135-size roll films, which has been interchanged from the condition of printing 135-size cut films is illustrated in detail below: 125a is a roll film web roll hold means, and 125b is a take-up means. 125c and 125d are guide rollers. 126 is a roll film, which is transported from the roll film web roll hold means 125a through guide roller 125c, transport section $A_1$, and negative film mask section $C_{12}$, and further through guide roller 125d to be wound up by the take-up means 125b. 127 is a film feed guide roller. 128 is a film cleaner section, and 129 is a film cleaner stand, which moves in parallel.

The structures of the photographic printer of the present invention are as has been described above. The actions of the photographic printer are subsequently described below:

Firstly, in the case of the photographic printer prepared for printing disc films, the every holder case 102 with a unit of a plurality of disc films 101 prepared thereinside is loaded. In the first place, the first disc film 101 is settled in the initially set position by locating holder case 102. The disc film 101 is held by magic hand 103. The rotative arm 104 which is provided thereon with the magic hand 103 holding the disc film 101 pivots 180 degrees upon rotating shaft 104a to move the disc film 101 onto disc film transport section $A_{11}$. Magic hand 103 with the disc film 101 held thereby is turned 180 degrees on the rotative arm 104 to put the disc film 101 on the disc film rotating axis casing 105a (arranged on the same line facing opposite to 105b) whose center axis is lifted up. The center axis moves down and the disc film 101 becomes apart from magic hand 103. The disc film 101 on disc film rotating axis casing 105a is subjected to a cleaning and bar code readout treatments, and the like, to be specified. Disc film rotating axis casing 105a, due to the rotation of 180 degrees of arm 106 by arm rotating shaft 106a, is rotatively transported to the position of rotating axis casing 105b (arranged on the same line facing opposite to 105a).

The disc film 101 comes into the underside of disc film leap prevention plate 108, and in the position underneath negative film mask plate 107, is rotated frame after frame by frame feed ratchet 110, and then exposed through exposure window 107a to the exposure light from an exposure light source (not shown), and the light that has passed through the image frame with the image examined through viewer 109 is focussed on a photographic printing paper, whereby a printing exposure of the printing paper (not shown) is performed.

Upon completion of all the 15 frames, the disc film 101 is released from the negative film mask 107 and frame feed ratchet 110 to become free, and is then moved to the position of disc film rotating axis casing 105a, the 180 degrees opposite side thereof, by the 180-degree rotation of arm 106. The center axis of rotating axis casing 105a rises, and magic hand 103 holds the disc film 101 on rotating axis casing 105a. The center axis moves down and the disc film 101 becomes apart from rotating axis casing 105a. The magic hand 103 with the disc film 101 held thereby is turned 180 degrees on rotative arm 104, and stands ready. Rotative arm 104 rotates 180 degrees counterclockwise by the rotation of rotating shaft 104a, and the disc film 101 held by magic hand 103 is inserted into the holder member of the original holder case 102. The disc film 101 is released from the magic hand 103 when the hand opens, and the disc film 101 rests on the holder member. Next, the holder case 102 moves one stair up, the subsequent disc film 101 is held by magic hand 103, and the operation of the second disc film 101 is repeated the same. And, films from the third downward are to be treated also in the same way.

On the other hand, where the photographic printer prepared for the 135-size cut film printing, one of the cut films 111 placed with their emulsion side up in the holder grooves 113 of cut film holder case 112 is drawn out by sprocket 114 in rotating motion. The cut film 111 advances through regulation guide 115b, passes over guide plate 115a, and comes into film advance plate 117. The lever operation of changeover member 116d causes roller support plate 116e to move down, so that cut film feed rollers 116a, 116b and 116c move down to the film advance plane to come into contact with the lower pressure rollers (not shown) and rotate synchronously.

Side guide rollers 119 move in parallel transversally so as not to obstruct the advance of the cut film 111. The cut film 111 advances along guides 118 on film advance plate 117. The film passes under negative film mask plate 120 of negative film mask section $C_{12}$ and held down frame after frame by negative film pressure plate 121 to be stopped at the position underneath exposure window 120a, and the film is then exposed to the light from the printing exposure light source (not shown) provided above. Frame-by frame feed of the cut film 111 is made by main feed roller 124 and cut film feed rollers 116a, 116b and 116c, and upon completion of the maximum 6-frame exposures, the main feed roller 124 and cut film feed rollers 116a, 116b and 116c rotate inversely to transport back the cut film 111 on the original transport path plane. The film passes back over guide plate 115a, passes through regulation guide 115b, and is then inserted back into the original holder groove 113. The cut film 111 is slid deep in by inertia as far as it runs against the partition wall (not shown), so that succeeding cut films returned are stored with their rear ends aligned vertically. Holder case 112 moves for one stair groove interval, the second cut film 111 is engaged by sprocket 114, and the second cut film 111 is then repeatedly transported for the printing operation in the same manner.

Next, where the photographic printer is prepared for the roll film printing operation, cleaner stand 129 is moved in parallel to be inserted into the position from which guide plate 115a is moved back away. 125a and 125b are roll film web roll hold means and roll film take-up means, and 125c and 125d are guide rollers, 126 is a roll film, which is wound around the roll film web roll hold means 125a, and which goes through guide roller 125c, changes its advance direction 90 degrees at film feed roller 127, advances with its emulsion side up through the underside of cleaner section 128 to go along guides 118, advances with its both sides guided by guide rollers 119 to pass film advance plane 117 and pass through the underside of negative film mask plate 120, then through main feed roller 124, further through guide roller 125d to be finally wound up by take-up means 125d. At this time, by the lever operation of changeover member 116d, cut film feed rollers 116a, 116b and 116c are in the up position together with roller support plate 116e, so that the rollers do not touch the roll film.

Frame-by-frame location of the roll film is made by negative film pressure plate 121 and the printing exposure for each frame is made through exposure window 120a by exposure device (not shown) from the top. The image of each frame may be examined through viewer 122. Judgement of the negative film may be made at examination window 123. In the case of half-size-frame roll films, the half-size exposure window 120b of negative film mask plate 120 is used.

The photographic printer of the present invention, because of its construction in combination of interchangeable component mechanisms, can meet immediately the need for printing operations of film lots comprised mixedly of disc films, cut films and roll films (full-size and half-size), and enables to make the best use of the limited floor spacing of the facilities of any photo service bureaus or photofinishers. Further, in the printing operations of disc films and 135-size films, the disc film printer components exclusively prepared for the disc film printing process and the 135-size film printer components exclusively prepared for the 135-size film printing process can be interchanged in the very simple and easy manner, so that even the handling of different films does not lower the operation efficiency, thus permitting retaining the productivity on a high level. Furthermore, in the photographic printer of the present invention, because the interchange is made between component units, even if a trouble occurred somewhere in any of the components, by replacing the troubled component unit alone, a train of the functions of the photographic printer can work with no trouble, so that the interchangeable system facilitates the maintenance of the photographic printer and retaining on a high level the rate of the operation of the machine.

Figure 4:
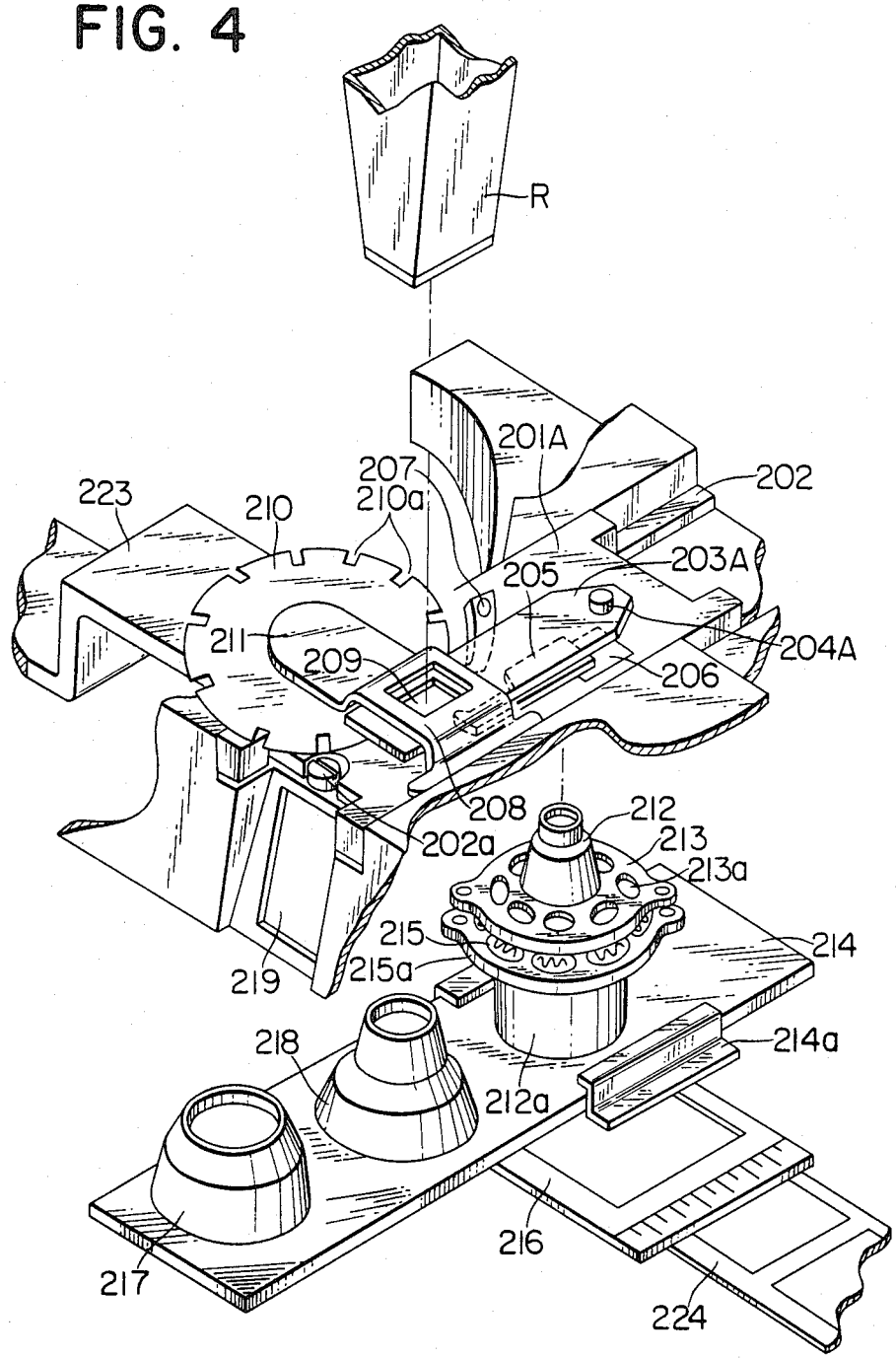
FIG. 4 is a perspective view showing the condition of the printing device of the present invention which is prepared for the printing exposure for disc negative films.
Figure 5:
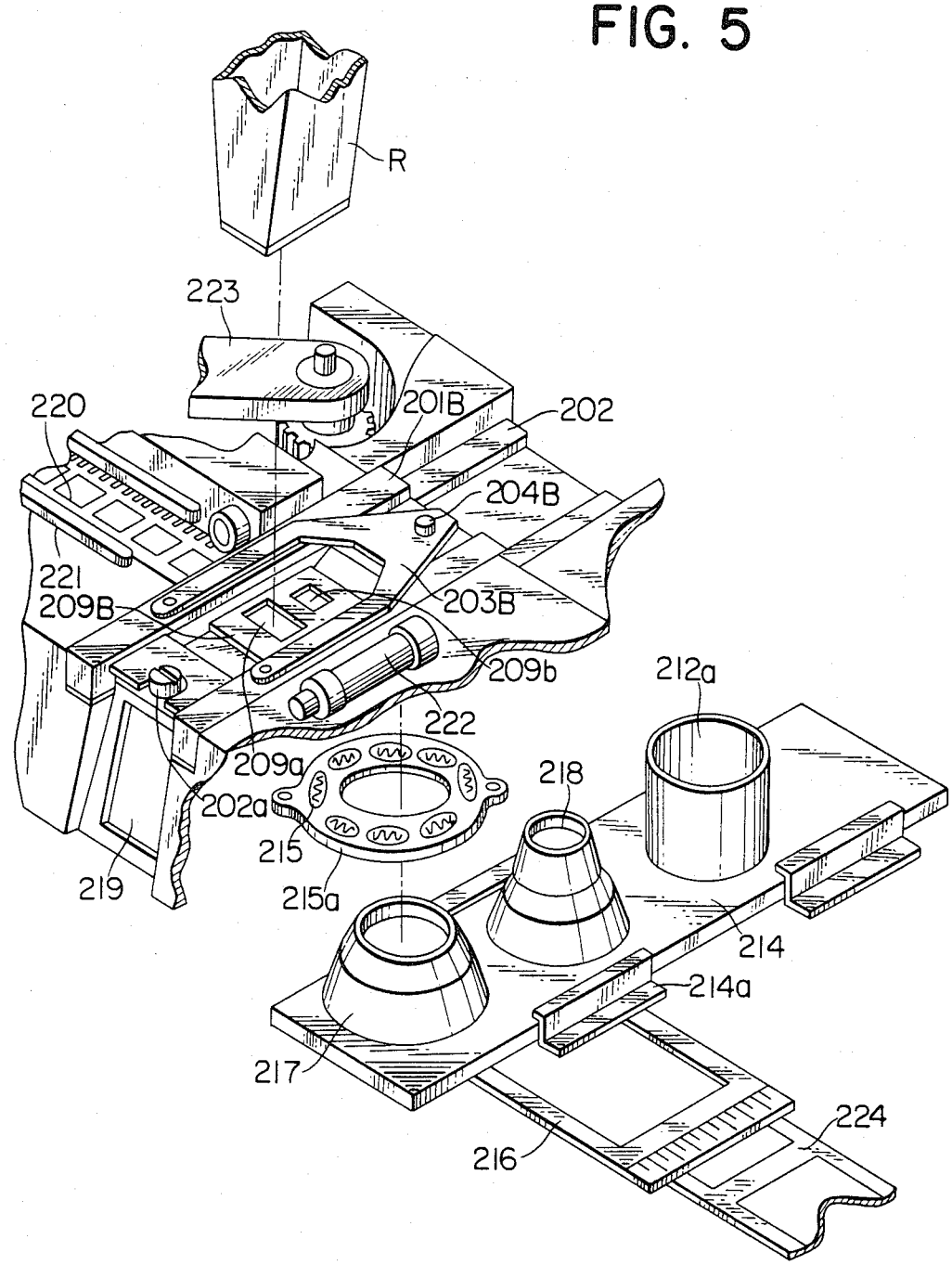
FIG. 5 is a perspective view showing the condition of the printing device of the present invention which is prepared for the printing exposure for 135-size negative films.

The printing section of a photographic printer in the present invention is illustrated in detail below with reference to the drawings wherein FIG. 4 is a perspective view showing the condition of the printing section during the time of printing exposure of disc negative films, and FIG. 5 is a perspective view showing the condition of the printing section during the time of printing exposure of 135-size films.

In the drawings, 201A is a disc negative film mask, 202 is a negative film mask guide, into which is to be inserted the disc film mask, 202a is a set pin, 203A is a negative film pressure plate, which is located on the disc negative film mask, 204A is the terminal of the negative film pressure plate, which terminal is the fixing axis of negative film pressure plate 203A, 205 is a frame feed ratchet, 206 is solenoid, which follows frame feed ratchet 205, 207 is a frame locator pin, which is arranged on disc negative film mask 201A, 208 is a negative film pressure plate hold-down plate, 209 is an exposure window, which pierces both negative film pressure plate hold-down plate 208 and negative film pressure plate 203A, 210 is a disc film, 211 is a disc film leap prevention plate, which forms the tip of negative film pressure plate hold-down plate 208, 212 is a disc film lens, 212a is a hood, which is on the lens slide plate and located under disc film lens 212, which all are combined into one unit, 213 is a disc film lens holder, 213a is a photometric hole, a plurality of which holes (e.g., 12 holes) are provided in disc film lens holder 213, 214 is a lens slide plate, 214a is a lens slide plate guide, 215 is a photometric detector, 215a is a detector plate, 216 is a photographic printing paper easel, 223 is an arm, and 224 is photographic printing paper.

In FIG. 5, 201B is a 135-size negative film mask, 202 is a negative film mask guide, into which is to be inserted the 135-size negative film mask, 203B is a negative film pressure plate, which is located on the 135-size negative film mask, 204B is a negative film pressure plate terminal which is the fixing axis of negative film pressure plate 203B, 209B is a negative film mask which is under the negative film pressure plate 203B, 209a is a full-size exposure window, which is provided in negative film mask plate 209B, 209b is a half-size exposure window, which is provided next to full-size exposure window 209a in negative mask plate 209B, 217 is a 135-size film full-size lens, which is provided on lens slide plate 214, 201B is a half-size film lens, which is provided next to full-size film lens 217 on slide plate 214, on which plate is also provided hood 212a for the disc film lens, 219 is a viewer, 220 is a 135-size film, 221 are 135-size film guide plates that guide both sides of 135-size film 220, 222 is a 135-size film feed roller, 223 is an arm, and 224 is photographic paper.

The printing device is of the above structure, and has the following actions. As shown in FIG. 4, disc negative film mask 201A is inserted into negative mask guide 202, and fixed by set pin 202a, whereby the printing device of this invention becomes a disc negative film mask provided printing device. Subsequently, as shown in FIG. 4, disc film lens 212 is fixed to the fixing end (not shown) provided underneath disc negative film mask 201A, and then hood 212a on lens slide plate 214 is automatically brought to the point below the printing position, whereby the printing device of this invention becomes a disc film lens-provided printing device.

When disc film 210 is transported in by arm 223, disc film 210 is inserted into and stops at the underside of disc film leap prevention plate 211. Next, the square notch 210a of disc film 210 is engaged by frame feed ratchet 205, and frame feed ratchet 205 moves in parallel by the drive of solenoid 206, whereby disc film 210 rotates in stepping motion frame by frame. At this time, the tip claw of frame locator pin 207 engages with square notch 210a to stop the frame at the correct position. Negative film pressure plate 203A is caused by the drive of negative film pressure plate terminal 204A to descend upon disc film 210 to press on and fix disc film 210. The center of disc film 210 is retained also by disc film leap prevention plate 211. Disc film 210, after being fixed with its flatness retained, is subjected to the light from the light source R thereabove, and the light proceeds toward exposure window 209 to pass through disc film 210, through disc film lens 212, and further through hood 212a, and finally focuses on photographic printing paper 224 fixed by photographic printing paper easel 216. At this time, the quantity of light and the balance of the respective chromatic components of the light are automatically controlled. That is, the light that has passed through photometric hole 213a provided in disc film lens holder 213 reaches photometric detector 215, and the respective chromatic components' LATD are measured. In this example, a pair of detectors 215 are provided in the lensdiametral direction for each chromatic component of the light, and from the average photometric value of each chromatic component (ringing current value), the exposures of the chromatic components of the light are automatically controlled so as to become the best balanced exposure to the photographic printing paper.

A plurality of detectors 215 on detector plate 215a are arranged independently side by side in a circle in the positions underneath and corresponding to photometric holes 213a.

Detector plate 215a is pierced in the center thereof with center hole 215b for the optical path of exposure light. And underneath center hole 215b is present hood 212a. The image to be focussed inside photographic printing paper easel 216 is reflected by a reflective mirror (not shown) to be projected upon viewer 219, thus enabling to confirm the image by the eye.

After completion of the exposure for one image, negative film pressure plate 203A is lifted up to free disc film 210. Frame feed ratchet 205 is moved in parallel by solenoid 206 to again rotate disc film 210 for one frame movement to be ready for the subsequent image exposure. The same is repeated thereafter.

As has been described above, the printing exposure for disc film 210 is rapidly performed by the printing device provided with disc negatige film mask 201A and disc film lens 212.

The action of the printing device of the present invention in the handling of 135-size film is subsequently illustrated in detail as follows:

As shown in FIG. 5, 135-size negative film mask 201B is inserted into negative mask guide 202, and then fixed by set pin 202a, whereby the printing device of the present invention becomes a 135-size negative film mask-provided printing device. On the other hand, lens slide plate 214 onto which are mounted 135 full-size film lens 217 and half-size film lens 218 detects the fixed condition of the 135-size film mask to automatically make a changeover of itself to the full-size position or to the half-size position, whereby the printing device of the present invention becomes a full-size or half-size film printing device provided with 135-size film lens. At this time, arm 223 is moved to an appropriately given position, and the guide jig for 135-size film is mounted in place of the arm. In addition, the position and the like of photographic printing paper 224 are the same as in the case of the foregoing disc film printing.

135-size film 220 is guided in and inserted by 135-size film guide 221 and stops at the underneath of negative film mask plate 209. A full-size or half-size selection is made to settle either full-size exposure window 209a or half size exposure window 209b. For example, when the full-size exposure window has been selected, negative film pressure plate 203B descends upon 135-size film 220 by the drive of negative pressure plate terminal 204B to press on and fix the 135-size film 220.

After the 135-size film 220 is thus fixed, the light from exposure light source R provided above passes through full-size exposure window 209a, through the 135-size film 220, and through full-size film lens 217, and then finally focussed on photographic printing paper 224 fixed by the printing paper easel 216.

The quantity of the light and the balanced exposure at this time are automatically measured to be controlled. That is, part of the light that has passed through negative mask plate 209B reaches detector 215 that is disposed in the proximity of exposure window 209a, and the respective chromatic components of the light are photometrically measured by the detector. From the photometric value (ringing current value) of each chromatic component of the light, the chromatic light exposures are automatically controlled so as to become the best balanced exposure to photographic printing paper 224. The image focussed inside photographic printing paper easel 216 is projected through a reflective mirror (not shown) upon viewer 219, thus enabling to confirm the focussed image by the eye similarly.

Upon completion of the exposure for one image frame of the 135-size film 220, negative film pressure plate 203B is lifted up to thereby free the 135-size film 220. Film feed roller 222 rotates to move in parallel the 135 size film for one frame to be ready for the subsequent image exposure. The same is repeated thereafter.

On the other hand, when the half-size exposure has been selected, half size exposure window 209b of negative film mask plate 209 is settled, and by the movement of lens slide plate 214, half-size film lens 218 is settled to the center of the optical path. The parallel movement of 135-size film 220 for each frame is made sequentially, and thus the frame-by-frame exposures are made. As has been described above, the printing exposure of 135-size film 220 is performed rapidly by the printing device of the present invention which is equipped with 135-size negative mask 201B and 135-size film lens 217 or 218.

According to the printing device of the present invention, the disc negative film mask and the 135-size negative film mask are interchangeable, so that even if disc films and 135-size films are mixed in the product to be dealt with, a quick preparation for the appropriate disposal of films of either type can be made at any time, and therefore, the improvement of the service operation can be carreid out. Also in the case of 135-size films, because the full-size-half-size changeover is readily made at any time, the device can be utilized as a multi-use printing device, so that it is a highly efficiently operable printing device.

In addition, according to the present invention, the printing device is easily designed so as to obtain the following functional effects: That is, in the lens system, by merely moving the slide plate, an exclusive lens can rest at the point in focus of its own, so that no focussing readjustment is required at each time when the kind and size of film is changed, and thus the printing operation can be performed very efficiently. No exposure readjustment for each frame is required because well balanced chromatic component exposure settings are made by an automatic control to establish an exposure, which is then measured by the photometer thereby to be controlled, and the automatic and continual printing operation can be made, so that it is a highly efficient printing device. Because the flatness of a negative film is secured by the negative film pressure plate, even in a large enlargement magnification, the focussing of an image on photographic printing paper can be made perfectly, and consequently the finished image becomes a high quality product.

Aforegoing is a description on the photographic printer wherein disc films and 135-size films are changed each other and following are the descriptions on the examples of both the photographic printer for disc films and the photographic printer for 135-size films.

Figure 6:
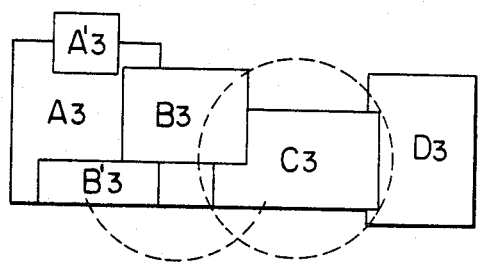
FIG. 6 is a schematic drawing showing the construction of the photographic printer for disc film use in the present invention.

The photographic printer for disc films of the present invention is illustrated in detail with reference to the drawings. FIG. 6 is a schematic diagram showing the construction of the photographic printer for disc films of this invention, wherein $A_3$ is a holder section for photographic disc films, the holder section being attachable and detachable, and $A'_3$ is a holder case for photographic disc films. $B_3$ is a bar code readout section, and $B'_3$ is a magic hand which links holder section $A_3$ to bar code readout section $B_3$. $C_3$ is a rotary transport section, and $D_3$ is a printing section. Holder section $A_3$, bar code readout section $B_3$, rotary transport section $C_3$ and printing section $D_3$ are independently driven, respectively, and they are all operated continuously.

Figure 7:
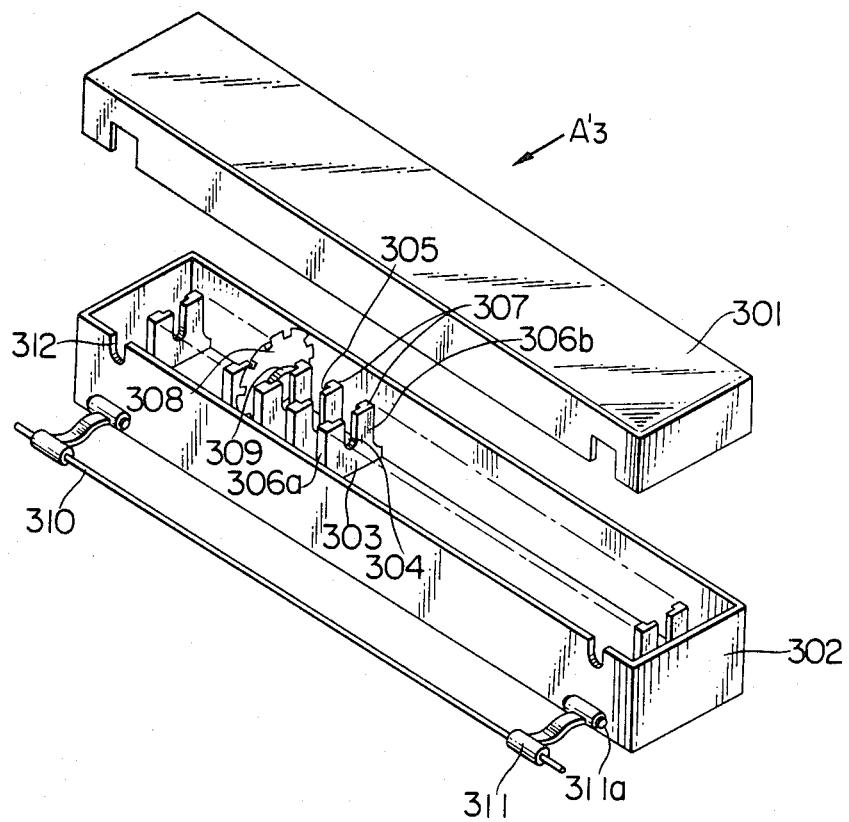
FIG. 7 is a perspective view of the holder case used in the photographic printer for disc film use in the present invention.

In FIG. 7, the structure of holder case $A'_3$ is described in detail below: Holder case $A'_3$ is comprised of a cover 301 and a case 302. 303 is a holder member. A plurality of holder members 303 are arranged equidistantly spaced apart in case 302. 304 is a center cut, and 305 is a double cut, which are provided in the center of holder member 303. 306a and 306b each is a side cut which is on each of both sides of holder member 303. 307 is a rack, which becomes the upper surface of holder member 303 when case 302 is in the position of being stood erect. Core 309 of a disc film 308 is inserted into double cut 305, and thus disc film 308 is put in between holder member 303. 310 is a hold-down rod, and 311 are spring arms that support both ends of hold-down rod 310. 311a is a spring arm mounting end, which pivotally mounts spring arm 311 to case 302. 312 are nicks, which are provided at the points, respectively, corresponding to the positions to which the upper and lower spring arms 311 are attached. Hold-down rod 310 is held by spring arms 311 toward the inside of case 302, the hold-down rod holding temporarily the edge of a plurality of disc films 308.

The above construction-having holder case A'$_3$ is mounted to holder section A$_3$ functions as the supply and receiving case of disc films 308.

Figure 8:
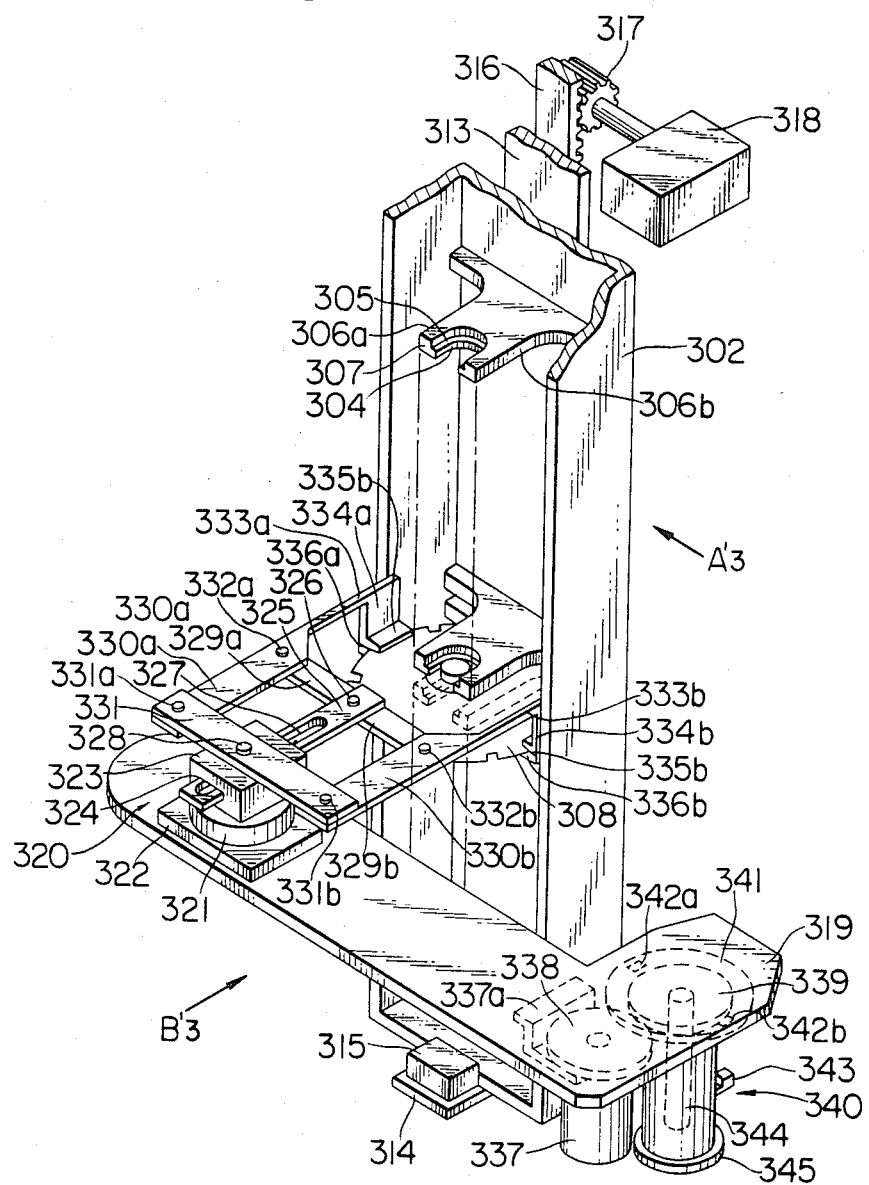
FIG. 8 is a perspective view illustrating the mechanism of the holder section of the photographic printer for disc film use in the present invention.

In FIG. 8, holding section A$_3$ is illustrated in detail. 313 is a rack plate, and 314 is a support plate, the back plate 313 and the support plate 314 being perpendicularly to each other. 315 is a case setting plate, which is provided on support plate 314. 316 is a rack, which is provided on the back of back plate 313 to be contacted with a guide (not shown) to slidably move in parallel. The shaft of a motor 318 is fixed to pinion gear 317, which is in combination with rack 316. On the other hand, magic hand section B'$_3$ is positioned in front of holder case A'$_3$, which is provided to holder section A$_3$. The structure of magic hand section B'$_3$ is described in detail in the same drawing. 319 is an "L"-shaped rotative plate which supports magic hand 320. Rotative plate 319 is provided at one end thereof with a magic hand 320 and at the other end thereof with a rotary control section 340. 321 is a rotary solenoid, and 322 is a pedestal, the rotary solenoid 321 being fixed onto the pedestal 322. 323 is a box-type solenoid. A center piece 325 passes through the internal opening 324 of box-type solenoid 323. Center piece 325 is pierced with a long and narrow hole 327 in the center line position thereof. 328 is a magic hand rotating shaft, which passes vertically through the center of box-type solenoid 323. 329$a$ and 329$b$ are wing pieces which are pivotally mounted by pin 326 of center piece 325 to center piece 325, and both ends of the wing piece are pivotally mounted by pins 332$a$ and 332$b$ to magic hand arms 330$a$ and 330$b$, respectively. Magic hand arms 330$a$ and 330$b$ are pivotally mounted by pins 331$a$ and 331$b$ to both ends of magic hand arm support plate 331. In the center of magic hand arm support plate 331 there is caulked magic hand rotating shaft 328. 333$a$ and 333$b$ are tips of magic hand, the tips being provided perpendicularly downward with folded-down plates 334$a$ and 334$b$, respectively, the folded-down plates 334$a$ and 334$b$ being provided horizontally inwardly at the ends thereof with disc hold members 335$a$ and 335$b$ having disc hold grooves 336$a$ and 336$b$.

The other end of rotative plate 319 is provided with rotation control section 340. 337 is a rotation drive motor which is fixed by pedestal plate 337$a$ to rotative plate 319. The shaft of rotation drive motor 337 is coaxially provided with a first drive gear 338, which is so arranged as to make a planetary motion by being engaged with a second drive gear 339 which is mounted to the other end of a hollow rotating shaft support cylinder 345. 341 is a position detector plate, which is provided superposedly upon second drive gear 339 and fixed to a rotative plate 319. Rotating shaft 344 is the center of position detector plate 341, which is inserted into hollow rotating shaft support cylinder 345 and supported by a bearing. Reflective marks 342$a$ and 342$b$ are applied onto the inside surface of and in the diametral position of position detector plate 341. 343 is a photosensor, which is fixed to the support plate from rotating shaft support cylinder 345. Photo sensor 343 faces opposite to reflective marks 342$a$ and 342$b$. Rotating shaft 344, following position detector plate 341, supports rotative plate 319. 345 is rotating shaft support pedestal.

Figure 9:
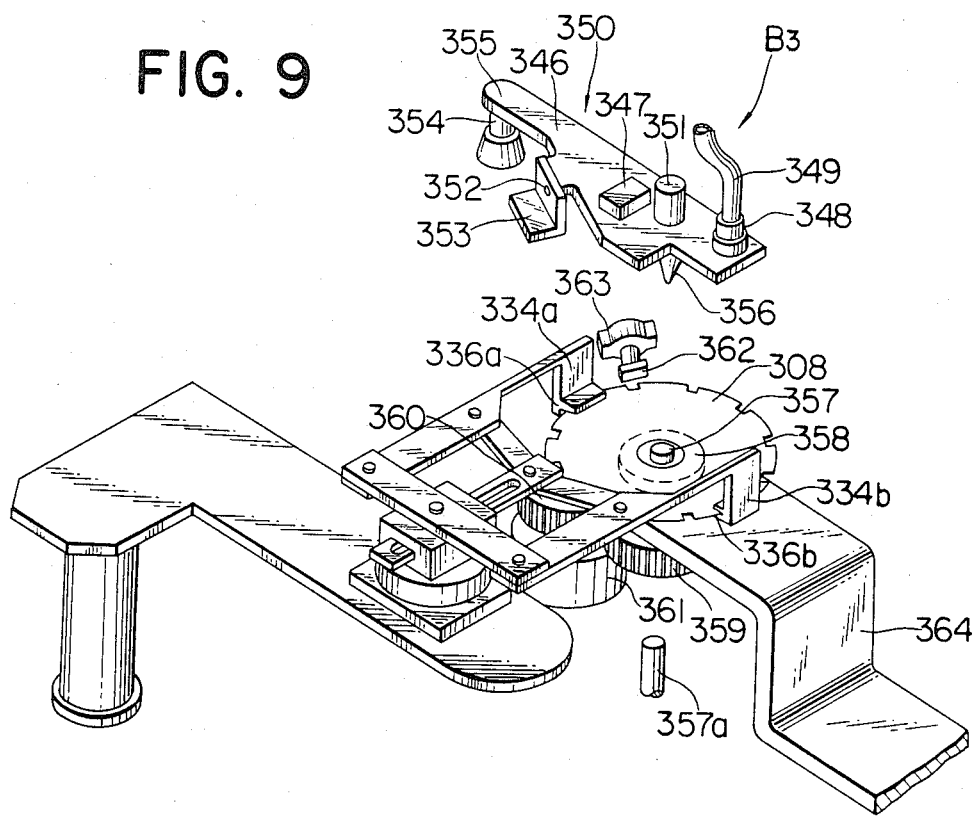
FIG. 9 is a perspective view illustrating the mechanism of the bar code readout section of the photographic printer for disc film use in the present invention.

In FIG. 9, the structure of bar code readout section B$_3$ is illustrated in detail. 350 is a bar code readout head. Bar code readout head 350 comprises a code readout base plate 346 provided thereon with a magnet code head 347, disc cleaner 348, air hose 349, and locator axis casing holder 351. Code readout section base plate's end portion 355 is provided thereunderneath with a code readout section pressing shaft 354. Code readout base plate 346 is fixed by means of a support axis 352 and supporter piece 353 to the body (not shown). The lower end of locator axis casing holder 351 is in the form of sticking out as locator axis holder 356. Locator axis holder 356 is located perpendicularly and spaced with a given distance apart from and above on the center line of disc rotation axis 357. Below the center line is a center shaft 357$a$ which goes up and down. Disc rotation axis 357 is provided therearound with a disc rotating casing 358 which is fixed to arm 364. Disc rotation axis 357 is linked through disc rotating casing 358 to casing rotating gear 359. 360 is a drive gear, which is engaged with casing rotating gear 359, and fixed to drive motor 361. 362 is a brake plate, which is located near the periphery of a disc film 308, and is connected to pressure solenoid 363.

Figure 10:
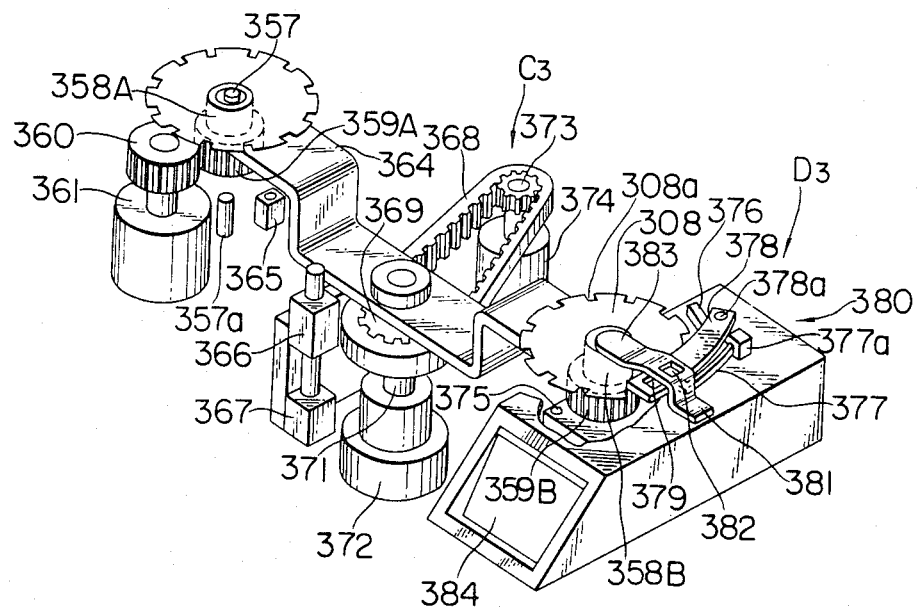
FIG. 10 is a perspective view illustrating the mechanism of the rotary transport section and the printing negative mask section of the photographic printer for disc film use in the present invention.

In FIG. 10, the structure of rotary transport section C$_3$ is described in detail. Rotary transport section C$_3$ has on both sides of arm 364 rotating casings 358A and 358B, and is supported by an arm rotating shaft 371 fixed at arm's center 370, and is fixed through an arm rotating shaft holder pedestal 372 to the body (not shown). 365 is a photoelectron sensor, which faces opposite to the reflective plate (not shown) applied onto the lower side surface under casing rotating gear 359A. 366 is a stopper, which is in contact with arm 364, the stopper being coupled to solenoid 367. 368 is a timing belt, which is linked to pulley 369 fixed to arm rotating shaft 371 and drive pulley 373. Drive pulley 373 is fixed to the shaft of drive motor 374.

The structure of printing section D$_3$ is described in detail. Printing section D$_3$ is a disc film exposure system, which incorporates a lens system (not shown) therein. 375 is a first image frame determination sensor. 376 is an image frame locator pin. 377 is an image frame feed ratchet, which is inserted into solenoid 377$a$. 378 is a negative film pressure plate, which is pierced with an exposure window, and 378$a$ is the fulcrum of the negative film pressure plate. 381 is a negative film pressure plate hold-down plate, which is pierced with an exposure window and which guides negative film pressure plate 378. The other end of negative film pressure plate hold-down plate 381 extends over to the center of a disc film 308 on disc rotating casing 358B to be a disc leap prevention plate 383. Image frame locator pin 376, image frame feed ratchet 377, solenoid 377$a$, negative film pressure plate 378, and negative film pressure plate hold-down plate 381 are arranged in the center on the top surface of disc negative mask 380, and image frame locator pin 376, image frame feed ratchet 377 are located in the proximity of disc film 308, while negative film pressure plate 378 is located above disc film 308. 384 is a viewer.

The photographic printer for disc films of the present invention has the above construction, wherein a whole holder case A'$_3$, containing as one unit a plurality of disc films 308 arranged in rack 307 formed by holder member 303 inside case 302 is loaded in holder section A; cover 301 is removed from case 302, and then the case is stood on support plate 314 and against back plate 313, and subsequently set by case setting plate 315, thereby being provided in holder section A₃. In this instance, holder case A'₃, is provided in holder section A₃.

First, locating of the first disc film 308 is made by means of rack 316, pinion gear 317 and drive motor 318, whereby the initial film position is settled. Magic hand 320 faces opposite to the first disc film 308. Arms 330a and 330b of the magic hand are extended to a width dimension more than the diameter of disc film 308. In the positions of side cuts 306a and 306b of holder member 303, disc hold members 335a and 335b are disposed on the outside of the diametral periphery of disc film 308.

When center piece 325 is pulled by the action of box-type solenoid 323, wing pieces 329a and 329b that are connected by pin 326 of center piece 325 to the end of center piece 325 pivotally move inward. Magic hand arms 330a and 330b are then pulled inward by wing pieces 329a and 329b to inwardly pivot upon pins 331a and 331b, respectively, at both ends of magic hand arm support plate 331.

Disc film 308 rests in disc hold grooves 336a and 336b provided in disc hold members 335a and 335b, and is then supported by magic hand arms 330a and 330b. Because pedestal 322 is fixed to rotative plate 319, by the rotative movement of rotative plate 319, disc film 308 is drawn from rack 307. At this time, disc film 308 is drawn with taking a slight angle upward so as not to cause any friction between rack 307 and disc film 308, or with a slight downward movement of case 302 by rack 316.

Rotative plate 319 pivots upon rotary shaft 344 as large as 180 degrees. The rotation of rotating shaft 344 is made, with being controlled by rotation control section 340, by the drive of rotation drive motor 337. The driving force of rotation drive motor 337 is transmitted by first drive gear 338 and second drive gear 339. The 180-degree rotation of rotative plate 319 is controlled as a result of the detection by photosensor 343 of the rotated angle shown by reflective marks 342a and 342b on position detector plate 341.

Magic hand 320 stops after pivoting upon rotating shaft support pedestal 345.

Magic hand rotation axis 328 rotates 180 degrees by rotary solenoid 321 to cause the left and right hands of magic hand arm support plate 331 to reverse. At this time, the center of disc film 308 is located above the center axis of disc rotating shaft 357. In the condition that center shaft 357a goes up and rotation axis 357 is set in the center hole of disc film 308, center piece 325 is pushed out through box-type solenoid 323 to push magic hand arms 330a and 330b to become wider, thereby causing magic hand arm tips 333a and 333b to become wider, and thus disc film 308 is released from disc hold grooves 336a and 336b and then rests on disc rotating shaft 357. After that, center shaft 357a goes down again. Disc film 308 rests on disc rotating casing 358.

Subsequently, code readout section pressure shaft 354 goes up to push code readout section's base plate's end 355, so that bar code readout head 350 moves downward with support fulcrum axis 352 piercing supporter piece 353 as the fulcrum toward the above of disc film 308. Locator axis holder 356 contained in locator axis casing holder 351 arranged in code readout section base plate 346 guides the center of disc film 308 onto disc film rotating shaft 357, and in the condition that it is coincident with the core of rotation axis 357, bar code readout head 350 is located in the position corresponding to disc film 308.

And then the initial rotation of disc film 308 is made at the first speed (low speed).

The rotation of casing rotating gear 359 which is underneath disc rotating casing 358 is made by drive gear 360, and the action of pressure solenoid 363 causes brake plate 362 to touch upon the periphery of disc film 308 to lightly hold film 308, so that the rotation speed of disc film 308 becomes further lower than the initial rotation speed of disc rotating casing 358. During this period, air hose 349 of disc cleaner 348 blows out air onto disc film 308 to clean the surface thereof. When the nick of the center hole of disc film 308 comes to the key on the periphery of disc rotation axis 357, the nick is engaged with the key, and disc film 308 joins with disc rotating casing 358. At the same time, brake plate 362, by the action of pressure solenoid 363, departs from the periphery of disc film 308. Disc film 308 is then revolves at a given high rate on disc rotating casing 358.

On the other hand, the bar code on the core portion of disc film 308 is read out by magnet code head 348 to become a signal, which is then transmitted to the control section to be memorized. The number of the revolution of disc film 308 is detected by photoelectron sensor 365 thereby to be controlled.

After completion of the bar code readout, code readout section's pressure shaft 354 goes down, and bar code readout head 350 goes up again, and after that, stopper 366 touching upon arm 364 is pulled by the action of solenoid 367 to draw stopper 366 apart from arm 364. At the same time, the clutch (not shown) of pulley 369 is let in, and the driving force of drive motor 374 transmitted by timing belt 368 from pulley 373 rotates pulley 369, thus rotating arm 364 180 degrees. Disc rotating casings 358A and 358B are in the same form, and are located facing opposite to each other. Disc rotating casing 358B belongs to the printing section, and casing rotating gear 359B is free.

The disc film 308 on disc rotating casing 358B is rotated by film frame feed ratchet 377. The drive of solenoid 377a causes film frame feed ratchet to reciprocate in parallel, and the reciprocating motion rotates disc film frame by frame. Each frame feed is determined and temporarily stopped by the engagement of the claw of film locator pin 376 with each square 2 mm nick at the periphery of disc film 308.

Once a frame position is settled, negative film pressure plate 378 moves fulcrumming pressure plate fulcrum 378a to press from above on disc film 308. Disc leap prevention plate 383 extending from negative film pressure plate hold-down plate 381 is located with a slight interval above disc film 308 in order to prevent possible jumping of disc film 308 from disc rotating casing 358B.

Film frame locator pin 376 is released, and film frame ratchet 377 reciprocates in parallel again to rotate disc film 308 for one frame movement.

First frame is confirmed by first frame determination sensor 375, and then the exposure of the first frame is made in exposure means (not shown). Exposure operations for 15 frames are repeated. After completion of exposures for 15 frames, film frame locator pin 376 and film frame feed ratchet 377 are released to thereby free disc film 308.

The clutch of pulley 369 is let in, arm 364 rotates 180 degrees again, and disc rotating casing 358B stops at the position of disc rotating casing 358A. After center shaft 357a is pushed upward, magic hand 320 retains disc film 308, and then becomes in the state of descent again, and disc film 308 departs from disc rotating casing 358A. Magic hand 320 retains disc film 308 on rotative plate 319, rotary solenoid 321 is released, and magic hand rotating shaft inversely rotates 180 degrees, and further rotative plate 319 rotates 180 degrees clockwise to return to and stops at the initially set position. Disc film 308, in the condition of being held by magic hand 320, comes in front of rack 307 of holder case A′$_3$, and then disc hold members 335a and 335b come to side cuts 306a and 306b, box-type solenoid 323 acts to release disc film 308 from disc hold members 335a and 335b, and the disc film is returned to the original rack 307.

When, with magic hand 320 suspended, holder case A′$_3$ is moved by rack 316 for one step interval of holder member 303, the subsequent disc film 308 comes to the suspended magic hand 320, which becomes the same as in the initial condition, and thus the same operation is made again for the second disc film 308.

In the present invention, the photographic printer for disc films may also be of such a construction that there is no rotary solenoid 321, magic hand 320 is fixed to rotative plate 319, magic hand 320 is not rotatable, and when rotative plate 319 is rotated by a necessary quantity and at a point where it passes above rotary transport section C$_3$, magic hand 320 brings disc film 308 to rest it on disc rotating casing 358; or other equivalents.

The present invention is not limited to the above example, and it goes without saying that as long as not deviating from the requirements of the present invention, any different other constructions or components may be allowed to substitute for those of the above example. For example, the mechanism of taking disc films out of the holder section may also be such that slide plates are provided on both sides of pedestal 322, respectively, the slide plates having a slant, and pedestal 322 is fixed to rotative plate 319. A pedestal rack is provided which is fixed to pedestal 322 to be engaged with a pinion gear, and to the pinion gear is mounted the motor shaft, and the motor is fixed to rotative plate 319 (not shown). By the above-described construction, magic hand 320 advances together with pedestal 322 toward case 302 to approach the first disc film 308, and the drive of the motor rotates the pinion to move the rack, and thus pedestal 322 is guided by the guide plates on both sides of the pedestal to slidingly advances. At this time, magic arms 330a and 330b are extended to a width dimension more than the diameter of the disc film, and, as in the previously mentioned example, the arms hold the diametral periphery of disc film 308, and then pedestal 322 together with the rack and pinion makes backward movement, whereby film 308 is drawn out from rack 307. Besides, a further example is such that magic hand 320 is designed so that it, while moving in parallel, holds the periphery of the film unlike the preceding example wherein the magic hand, while rotating, holds the film. Furthermore, magic hand 320 is allowed to be so designed that it holds not the periphery but such a different part as, e.g., the core or core ring portion of film 308. As above, it goes without saying that other mechanisms or components may also be substituted by other equivalents in the present invention.

The photographic printer of the present invention is of such constructions as described above, in which the use of a single same holder section for both supply and receiving of photographic disc films permits making the whole printer compact. Because disc films are drawn out from and returned to the same holder case, the identity of films can be secured, no errors can occur in the sequence of films, so that there occurs no change in the order at all, and the operation is carried out without fail, thus permitting the establishment of the security for the processing service of film product.

Further, in this invention, the photographic printer can be easily constructed so that the following effects are obtained. Even if a trouble occurred during the printing exposure, the trouble can be removed by merely removing the troubled single film alone without causing any stumbling block in the line of the operation, and the operation can be easily restored to the originally set condition, whereby the photographic printer can continue its operation efficiently. And, a plurality of disc films can be handled as one unit wherein the sequence of the films is by no means confused, so that they can be well organized in good order, thereby requiring no assorting work of films by lot, thus enabling positively highly efficient and rapid processing service of film product.

Further, the holder section contains racks, and the rack's double cut and the diameter of the core facilitate the identification of the base side and the emulsion side of a disc film, thus bringing about no error. And the freedom of the center position of disc film is high, so that no trouble occurs in the position adjustment, and thus the printing operation of plurality of disc films can be carried out highly efficiently.

Now, the photographic printer for 135-size films will be illustrated next as follows.

Figure 11:
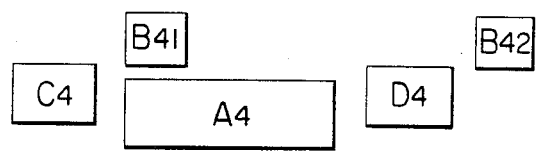
FIG. 11 is a schematic diagram of the construction of the photographic printer for 135-size film use of the present invention.

FIG. 11 is a schematic illustration of the photographic printer for 135-size films of the present invention, wherein A$_4$ is a transport section, B$_{41}$ and B$_{42}$ are roll film supply section and roll film take up section, respectively, and are located on the left side and right side, respectively, of and above transport section A$_4$. C$_4$ is a cut film holder case comprising a delivery and/or return mechanism, which is connected to transport section A$_4$, and D$_4$ is a negative film mask section, which is connected to transport section A$_4$ and used in common for both roll and cut films. A roll film from roll film supply section B$_{41}$ is transported by transport section A$_4$ to pass through negative film mask section D$_4$, and is brought to film take-up section B$_{42}$. And on the other hand, a cut film from cut film holder case C$_4$ is transported by transport section A$_4$ to be delivered to negative film mask section D$_4$, and then is returned therefrom to the same holder case C$_4$.

Figure 14:
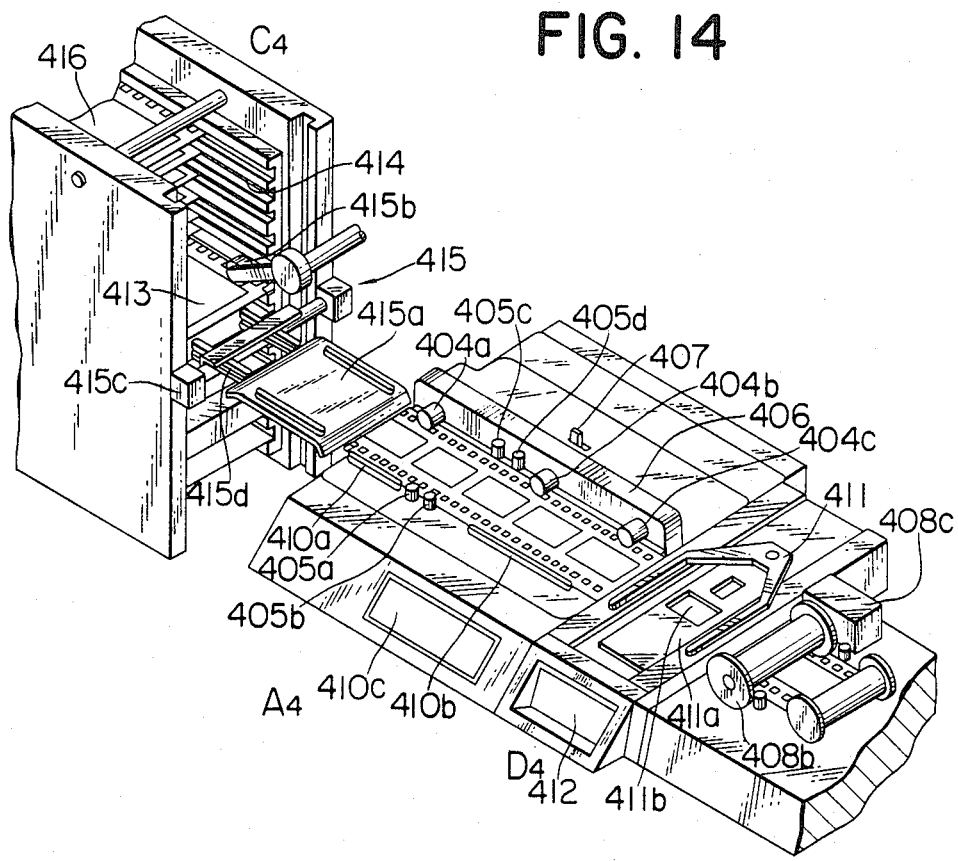
FIG. 14 is a partially cut-off perspective view showing the condition in operation with the use of cut films in the photographic printer for 135-size film use of the present invention.
Figure 12:
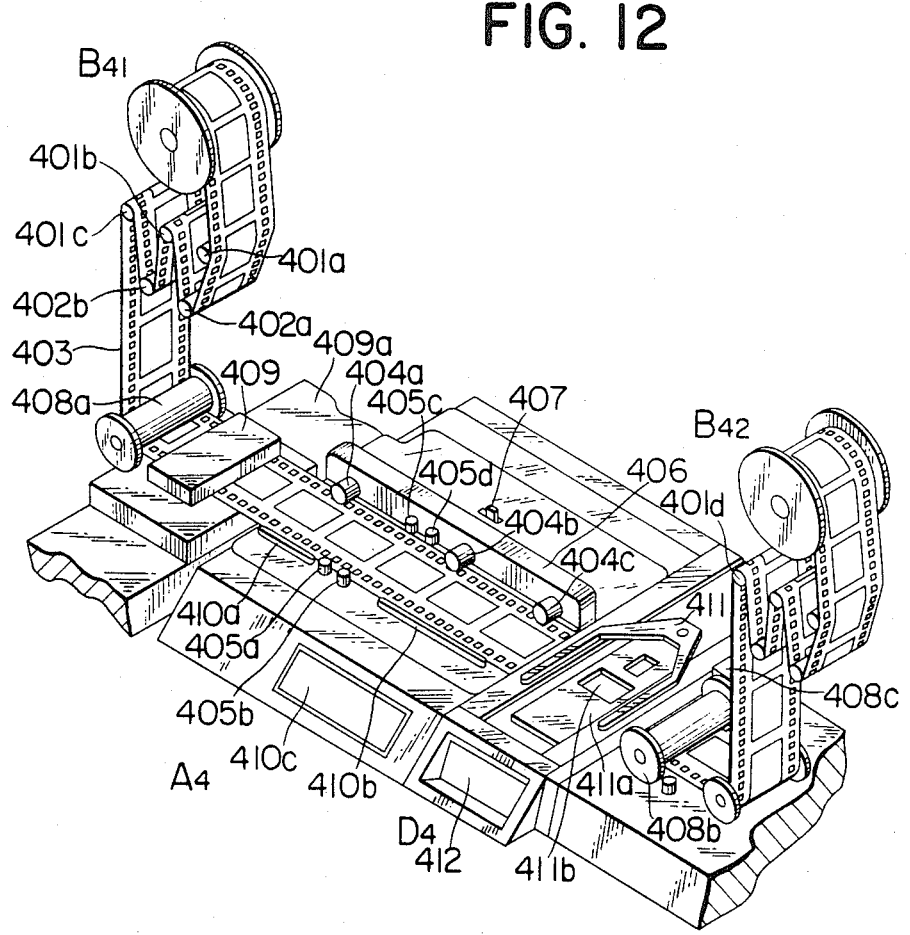
FIG. 12 is a partially cut-off perspective view showing the condition in operation with the use of 135-size roll film in the photographic printer of the present invention.

A preferred example of the photographic printer for 135-size films of the present invention is shown in FIG. 12, FIG. 13 and FIG. 14, and the construction thereof is illustrated in detail. As shown in FIG. 12, in roll film supply section B$_{41}$ and roll film take-up section B$_{42}$, 401a, 401b and 401c are guide rollers, 402a and 402b are accumulator rollers, which are linked to each other and move up and down. 403 is a roll film which threads through guide rollers 401a, 401b and 401c, and accumulator rollers 402a and 402b, whereby the tension of the film is adjusted. Roll film 403 starts from roll film supply section B$_{41}$ to thread through guide roller 401a, accumulator roller 402a, guide roller 401b, accumulator roller 402b and guide roller 401c, and then enters transport section A$_4$.

In transport section A$_4$, 404a, 404b and 404c are cut film feed rollers, and arranged forming up-and-down pairs with the lower pressure rollers 404d, 404e and 404f (shown in FIG. 13), respectively. 405a, 405b, 405c and 405d are side guide rollers, the 405a and the 405b standing in parallel with the 405c and the 405d, the 405a and the 405c facing opposite to the 405b and the 405d, respectively. The side guide rollers 405a and 405b supported by spring arms 405e and 405f are rotatable and movable in parallel so that the confronting interval becomes extended. 406 is a roller support plate, on which are arranged cut film feed rollers 404a, 404b and 404c independently of each other in front, in the middle, and in rear, respectively. 407 is a changeover member, which is movable left to right, and vice versa, to thereby move roller support place 406 up and down. 408a is a film feed guide roller, and 408b is a main feed roller which is driven by DC motor 408c. The foregoing guide roller 408a is located in between transport section A4 and roll film supply section B41, and the main feed roller 408b is located on the down-stream side of and contiguous to negative film mask section D4. 409 is a cleaner which is to clean the emulsion surface of roll film 403 that has passed through film feed guide roller 408a, 409a is a cleaner stand, which moves in parallel. 410a and 410b are transport guides which guide film 403. 410e is a negative's judgement window.

As shown in FIG. 13, the foregoing roller support plate 406 has thereinside a mechanism that interlocks with the changeover member. That is, pressure axes $410d_1$, $410d_2$, and $410d_3$ are the axes of cut film feed rollers 404a, 404b and 404c, the $410d_1$, the $410d_2$ and the $410d_3$ riding independently on pressure blocks 410f (only one in contact with pressure axis $410d_3$ is shown in the drawing), respectively. Roller mounting plate's rear bottom 410g is in contact with the other end of changeover member 407 to be moved up and down, and roller mounting plate pressure spring 410h is fixed to the inside of roller support 406 to drive the roller support 406 up and down.

In negative film mask section D4, 411 is a negative film pressure plate, 411a is a negative film mask plate, 411b is an exposure window which pierces the negative film mask plate 411a, and 412 is a viewer. And in holder case C4, 413 are cut films. 414 are holder grooves, into which cut films 413 are inserted. 415 is a delivery/return mechanism. 415a is a cut film guide plate, and 415b is a sprocket. 416 is a printing exposure-completed film.

The construction of the photographic printer for 135-size films of the present invention is as has been described above. The action of the photographic printer is subsequently illustrated below:

Firstly, the printing operation of roll films is explained. The delivery or return mechanism for cut films, by the parallel movement of cleaner stand 409a, is changed over to roll film cleaner 409, and then a web of roll film 403 is set in roll film supply section B41. This roll film 403 is threaded through guide roller 401a, accumulator roller 402a, guide roller 401b, accumulator roller 402b, and guide roller 401c in the described order, and then further through film feed guide roller 408a. This film is then threaded, turning its direction 90 degrees, through film cleaner 409; advanced along the transport guide 410a on transport section A4; led through between the 405a–405b and the 405c–405d; further advanced along transport guide 410b; then caused to pass through the underside of the mask plate 411 of negative film mask section D4; again threaded through main feed roller 408b; and then brought through guide rollers 401d to be taken up by the take-up means of film take-up section B42. In addition, the negative image manual judgement of film 403 is made at negative's judgement window 410c.

During transporting roll film 403, the transport of roll film 403 is made by the drive of main feed roller 408b. At this time, by the lever operation of changeover member 407, roller support plate 406 goes up to thereby release cut film feed rollers 404a, 404b and 404c from the lower pressure rollers, and thus the cut film feed rollers become spaced apart from the transport plane of negative film. That is, cut film feed rollers 404a, 404b and 404c, the press-on side (upper side) rollers, are independently pressed centering on pressure axis 410d by roller pressure spring 410e, but when changeover member 407 is switched, then the roller support plate 406 is lifted up by the force of roller mounting plate pressure spring 410h so as to depart from the lower pressure rollers 404d, 404e and 404f, so that cut film feed rollers 404a, 404b and 404c become free. However, because the interval between pressure block 410f and roller mounting plate 406 is regulated, by lifting up the roller mounting plate 406 more than the descent range determined thereby of cut film feed rollers 404a, 404b and 404c, the cut film feed rollers become released from the plane of roll film 403. In addition, the release is made on the basis of the mechanism that by moving changeover member 407, the tip of the lever is disengaged from the roller mounting plate's rear bottom 410g, whereby roller mounting plate pressure spring 410h lifts up roller mounting plate 406.

In addition, because side guide rollers 405a and 405b are movable in parallel, by spring arms 405e and 405f, the space formed by the side guide rollers and the confronting side guide rollers 405c and 405d is freely extendable, and the side guide rollers hold both sides of roll film 403 during the time of roll film transport. The roll film 403 advances from guide roller 401c through film feed guide roller 408a and film cleaner 409, and guided by transport guide 410a to be led by side guide rollers 405a, 405b, 405c and 405d, and further guided by transport guide 410b to enter negative film mask section D4.

The printing exposure of a roll film is made in the way that one image frame of a film is placed under exposure window 411a of negative film mask plate 411 in mask section D4, and then the frame image is subjected to an exposure light from a printing exposure device (not shown), whereby the image is printed on photographic printing paper. In addition, the printing image is monitored on viewer 412, so that the condition of the image can be in advance examined by the eye.

Printing-completed roll films are wound up in succession by the film take-up means of roll film take-up section B42.

Next, the printing operation of cut films is explained. As shown in FIG. 14, cleaner stand 409a is first moved in parallel to be placed outside the film advance position. Cut film guide plate 415a of cut film holder case C4 is then connected to the film advance position, whereby cut film holder case C4, transport section A4 and negative film mask section D4 become to stand in a straight line. Cut film holder case C4 is full of 35 mm-wide 135-size cut films 413 of 6 full-size frames in maximum and 3 frames in minimum prepared in order in the holder grooves 414 thereof. The holder grooves 414 each is of the length capable of covering the spacing somewhat longer than the interval between the tip of film draw-out sprocket 415b and the tip of delivery/- return mechanism 415 plus the length of a 6 full-size-frame 135-size cut film.

At the beginning when the holder case is installed, cut films 413 are all prepared with the fore ends thereof vertically aligned in holder case C₄, and the first cut film 413 is drawn out by rotating sprocket 415b engaging with the perforations thereof, and the film then slides out of holder groove 414 by delivery/return mechanism 415. The film passes over guide plate 415a and advances along guides 410a and 410b by cut film feed rollers 404a, 404b and 404c and main feed roller 408b of transport section A₄. In transport section A₄, roller support plate 406 descends by the lever operation of changeover member 407, and pressure axis 410d₃ provided to pressure block 410f descends with itself held horizontal to bring cut film guide roller 404c into contact with the lower pressure roller 404f. In like manner, cut film guide roller 404a and the lower pressure roller 404d, and cut film guide roller 404b and the lower pressure rollder 404e are simultaneously brought into contact with each other, respectively, and begin synchronous rotation. Under this condition, cut film 413 is transported by and between these rollers. The cut film then passes through the underside of negative film mask plate 411a, and is pressed on by negative film pressure plate 411 each time when an image frame comes to exposure window 411b, where the printing of the image is made by the printing exposure device provided above. The printing image is monitored on viewer 412 by which the condition of the focused image can be in advance examined. Printing-completed cut film 413 is transported back through transport section A to cross guide plate 415a again to get back to the original holder groove 414 by return mechanism 415. In delivery/return mechanism 415, when cut film 413 begins to be transported back by main feed roller 408b and cut film feed rollers 404a, 404b and 404c, sprocket 415b descends to the advance plane of the negative film to get ready for returning the cut film 413 to holder case C₄. Gear 415c is driven to rotate regulation guides (upper and lower) 415d to be changed to cause the gap between the upper and lower members of the guide to become narrower as they go toward the entrance of holder case C₄, thereby letting cut film 413 pass the entrance. Cut film 413 is then inserted slidingly into the original holder groove 414. Because the holder groove 414 is sufficiently long as previously mentioned, printing-completed cut film 416, by the rotation of cut film feed roller 402, is slid deep in by inertia as far as it runs against the partition wall (not shown), whereby returned cut films rest with their rear ends aligned vertically. Accordingly, no printing-completed cut films 413 will fall under the wing motion range of sprocket 415b, so that there occurs no contact troubles at all. During this period, in holder case C₄, an up-and-down rack (not shown) is used which moves in parallel for one stair interval of holder grooves 414 to engage sprocket 415b with the perforation of the second cut film 413, and thus cut films 413 are drawn out in succession. After completion of the return of all the printing-completed cut films to holder C₄, the holder case C₄ is replaced by another holder case C₄ which is full of other cut films to be printed.

According to the photographic printer for 135-size films of the present invention, the transport and printing of both roll films and cut films can be made in a single photographic printer, so that the photographic printer can meet immediately the need for mixed printing operations of concurrent making prints with film development and of making additional prints from cut films, and the changeover of the film handlings can be made by a simple operation, thus enabling the improvement of the productivity and the increase in the photofinishing service quality. There is no need for the installation of a number of exclusive photographic printers, and the floor area of any photofinishing service bureau can be effectively utilized with the compactly designed photographic printers of the present invention, thus leading to the reduction of the operation cost.

As illustrated above, the photographic printer of the present invention is not only excellent as a photographic printer wherein disc films and 135-size films are changed each other but also excellent as a special printer for disc films or as a special printer for 135 size films.

Changes may be made in the construction and arrangement of the parts or elements of the embodiments as disclosed herein without departing from the spirit or scope of the invention behind in the following claims.

What is claimed is:

1. A photographic printer comprising a negative film-supply-and-transport mechanism having both means to supply and transport 135-size films to their printing section and means to supply and transport disc films to its printing section which are interchangeable with each other, wherein said means to supply and transport disc films comprises a disc film supplying section containing a plurality of disc films wherefrom the disc films are transported automatically to the printing section therefor through a transporting section of said means to supply and transport disc films.

2. The photographic printer of claim 1, wherein said supply means has a film cleaner section for 135-size roll films and delivery section of a disc film holder case, which are mutually interchanged to supply either 135-size roll films or disc films.

3. The photographic printer of claim 1, wherein said supply means has a delivery section of the holding case for 135-size cut films to which a cut film holding case is connected and a delivery section of the holding case for disc films to which a disc film holding case is connected, which are mutually interchanged to supply either 135 size cut films or disc films.

4. The photographic printer of claim 1, wherein said transport means has the construction that the removal of a part of said transport mechanism for 135-size films causes the transport mechanism for disc films to be formed and enables it to transport disc films.

5. The photographic printer of claim 1, wherein said printing exposure section has a 135-size negative film mask section and a disc negative film mask section, which sections are mutually interchanged to ensure the printing exposures of either 135-size films or disc films.

6. A photographic printer comprising a holder section and a transport section for photographic disc films, wherein a photographic disc film is automatically drawn out from said holder section and, after being subjected to a printing exposure, is returned to said same holder section, wherein said holder section sequentially moves to thereby insure successive printing operations for a plurality of photographic disc films, and wherein said transport section has means which transports the photographic disc film to the printing position after it is drawn out from said holder section by a take-out mechanism and is brought to a bar code readout section provided on said transport section that performs a rotary transport thereof.

* * * * *